Figure 1:
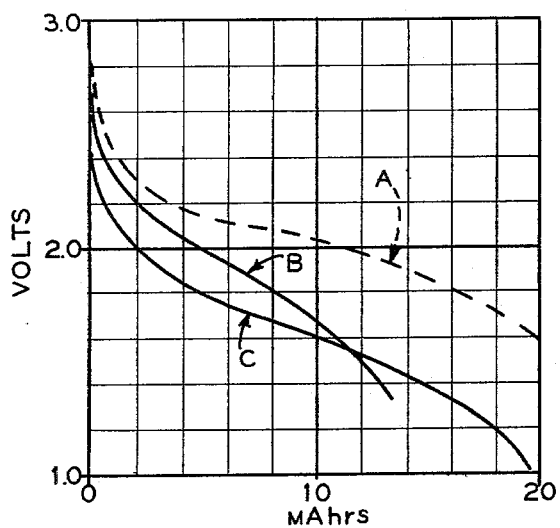

United States Patent [19]

Joshi et al.

[11] 4,288,505
[45] Sep. 8, 1981

[54] HIGH ENERGY DENSITY SOLID STATE CELL

[75] Inventors: Ashok V. Joshi, Fishkill, N.Y.; William P. Sholette, Warminster, Pa.

[73] Assignee: Ray-O-Vac Corporation, Philadelphia, Pa.

[21] Appl. No.: 200,275

[22] Filed: Oct. 24, 1980

[51] Int. Cl.³ .............................................. H01M 6/18
[52] U.S. Cl. .................................... 429/191; 429/218
[58] Field of Search ............... 429/191, 218, 199, 126

[56] References Cited

U.S. PATENT DOCUMENTS

| | | | |
|---|---|---|---|
| 3,455,742 | 7/1969 | Rao | 429/191 |
| 3,723,183 | 3/1973 | Greatbatch | 429/191 X |
| 3,837,920 | 9/1974 | Liang et al. | 429/191 |
| 3,988,164 | 10/1976 | Liang et al. | 429/191 |
| 4,118,549 | 10/1978 | Liang et al. | 429/191 |
| 4,190,706 | 2/1980 | Rao | 429/191 |
| 4,226,924 | 10/1980 | Kimure et al. | 429/126 |

*Primary Examiner*—Anthony Skapars
*Attorney, Agent, or Firm*—Raymond J. Kenny; Francis J. Mulligan, Jr.

[57] ABSTRACT

A solid state electrochemical cell having a lithium anode, a lithium-ion transport electrolyte and a cathode of high energy density material capable of reacting with the electrolyte and forming a stable, self-healing layer of electrolytically conductive reaction product of the electrolyte and the cathode material.

5 Claims, 3 Drawing Figures

HIGH ENERGY DENSITY SOLID STATE CELL

The present invention is concerned with lithium, solid state electrochemical cells.

HISTORY OF THE ART AND PROBLEM

U.S. Pat. No. 3,455,742 is illustrative of disclosures relating to high energy density, solid state, electrolytic cells having a lithium anode, a lithium-ion transport solid state electrolyte and a cathode compatible with the electrolyte. This patent discloses the use of various types of cathodes, for example, iodine and carbon mixes of oxides and halides of polyvalent metals such as AgO, $MnO_2$, $PbO_2$, $V_2O_5$, $CeO_2$, $FeX_3$, $HgX_2$, $TlX_3$, $CuX_2$ and the like wherein X denotes the halide atom. Unspoken, but exemplified in this patent is the fact that the art has considered this type of separator-free cell to be operative, when halidic electrolyte is used, only if the halide of the electrolyte is the same as the halide of the cathode and, when an oxidic electrolyte is used, only if the electrolyte is non-reactive with the cathode material under conditions of cell usage.

Up to now, it has been considered by the art that a separator is necessary between the electrolyte and the cathode when cathode materials are used which are reactive with the electrolyte. U.S. Pat. No. 4,118,549 is illustrative of a disclosure of a solid state cell of the kind in question using a separator. While the cells of U.S. Pat. No. 4,118,549 are operative, providing an ionically conductive separator as disclosed therein is an expensive and critical manufacturing operation.

DISCOVERY AND OBJECT OF THE INVENTION

It has been surprisingly discovered that when assembled in a lithium solid state battery cell configuration, a wide variety of cathode materials reactive with lithium-ion transport electrolytes will react in-situ to form a self-healing, electrolytically conductive microlayer of reaction product which will prevent further reaction and allow electrochemical usage of the anode and the cathode materials.

It is an object of the invention to provide novel, solid state lithium electrochemical cells which do not require use of a preformed separator.

Other objects and advantages of the invention will be apparent from the description and drawings of this application.

DRAWINGS

Figure 2:
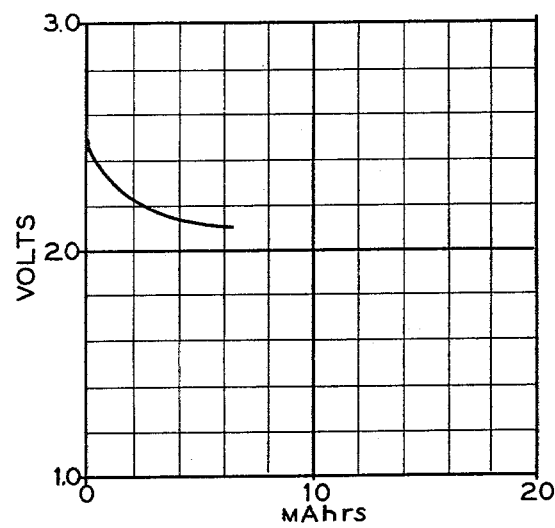
Figure 3:
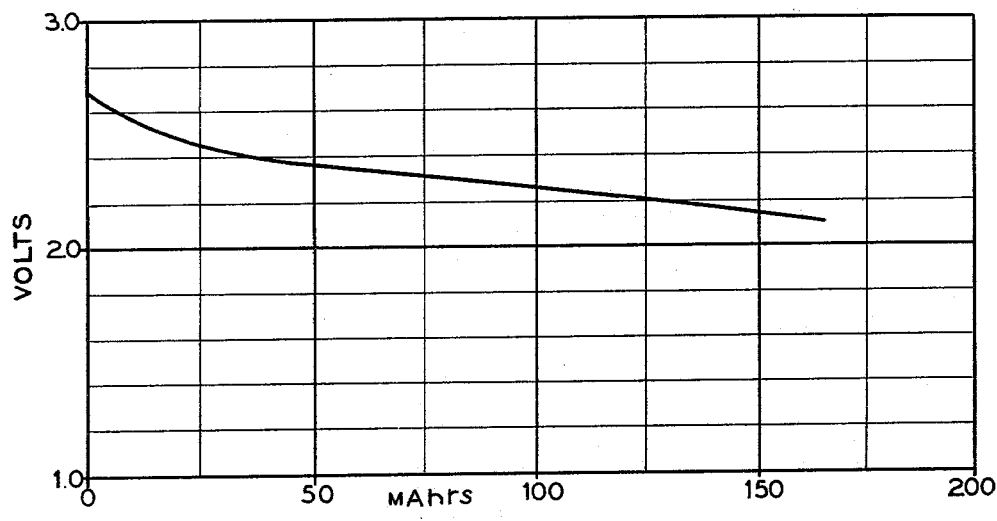

The drawings comprise:
FIG. 1 through 3 which illustrate discharge curves of lithium solid state cells of the present invention.

GENERAL DESCRIPTION

Generally speaking, the present invention contemplates a solid state lithium electrochemical cell having a lithium anode, solid state electrolyte capable of lithium-ion transport having a high electronic resistivity and selected from the group of lithium nitride, lithium sulfide, lithium metaborate and lithium iodide types of electrolytes in contact with said lithium anode and a cathode. The cathode is separated from the lithium anode by said electrolyte and comprises at least one high energy density compound reactive with said electrolyte and separated from said electrolyte by a stable, in-situ formed, self-healing layer of electrolytically conductive reaction product of said electrolyte and said cathode material. The anode and the cathode are in electrolytically conductive contact through said electrolyte and said in-situ formed, self-healing layer. Solid state electrochemical cells in accordance with the present invention generally are operative at ambient atmospheric temperatures and higher temperatures (within the solid state range of the cell components) and are generally stable in storage.

PARTICULAR DISCLOSURE

The lithium anodes used in the cells of the present invention are of any conventional form and composition. As known to the art, the anode can be pure lithium or an alloy rich in lithium. Electroltyes used in cells of the invention comprise essentially lithium nitride, lithium sulfide, lithium metaborate or lithium iodide (or mixtures thereof) which materials may be doped with dopants designed to increase the electrolytic conductivity of the solid nitride, metaborate, sulfide or iodide. For example, as disclosed in U.S. Pat. No. 3,837,920 (the disclosure of which is incorporated herein by reference) suitable dopants (or conductivity enhancing additives) for lithium iodide include iodides of alkaline earth metals and some other divalent metals. Other materials such as phosphorous triiodide and boron triiodide can also be used as conductivity enhancing agents for lithium iodide.

High energy density cathode materials useful in the present invention include fluorides, chlorides and bromides of metals normally considered for use in iodide salt form as cathode materials in lithium/lithium iodide/cathode cells. These metals include bismuth, tin, copper, lead and iron. The use of these flourides, chlorides or bromides is advantageous in that the energy density of these salts is usually greater than the energy density of the corresponding iodide. For example, $BiCl_3$ has theoretical energy density of 1211 milliampere hours per cubic centimeter (mA hr $cm^{-3}$) compared to the theoretical energy density of 788 mA hrs $cm^{-3}$ of $BiI_3$. Furthermore cathode expansion of $BiCl_3$ is theoretically only about 24% on discharge whereas the theoretical expansion of $BiI_3$ on discharge is about 33%. Accordingly, in many instances significant energy density and structural stability advantages can be achieved by use of chlorides, bromides or fluorides as cathodes rather than iodides.

In cells of the present invention the electrolyte, cathode reaction exemplified by

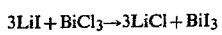

$$3LiI + BiCl_3 \rightarrow 3LiCl + BiI_3$$

which has been avoided by the prior art does occur to a very limited extent upon construction of the cell. However, the reaction products form a thin, protective layer which is self-healing and stops additional reaction. This layer is very thin. The protective layer forms substantially immediately on manufacture of the cell and nothing is necessary to its formation other than bringing the electrolyte and the cathode together in intimate contact as is conventional in solid state cell manufacture.

EXAMPLES

The following Examples will give a greater appreciation of the invention.

EXAMPLE I

Three cells each 1.52 cm in diameter having a 0.3 g cathode of 1.8 cm$^2$ area and an anode area of 1.4 cm$^2$ were constructed using the following solid state electrochemical systems:

A. Li/PI$_3$(5m/o); LiI/BiBr$_3$.I$_2$.TiS$_2$
   B. Li/PI$_3$(7.5m/o); LiI/BiBr$_3$.I$_2$.TiS$_2$
   C. Li/PI$_3$(5m/o); LiI/BiBr$_3$.TiS$_2$.Bi

The stoichiometric capacities of cells A, B and C were 52, 52 and 42 mA hr respectively. FIG. 1 of the drawing shows the discharge curves of these cells discharging at 37° C. through an external load of 120 kilo-ohms.

EXAMPLE II

FIG. 2 of the drawing depicts a discharge curve of a cell of the invention discharging at 70PC through an external load of 120 kilo-ohms. This cell is based upon the system.

D. Li/LiBO$_2$;CaI$_2$(30m/o)/BiBr$_3$.TiS$_2$.Bi

The cell was 1.52 cm in diameter having a 0.3 g cathode of 1.8 cm$^2$ and a stoichiometric capacity of 45 mA hrs.

EXAMPLE III

FIG. 3 of the drawing depicts a discharge curve of all of the present invention discharging at 145±3° C. through an external load of 3 kilo-ohms. This cell was based upon the system Li/LiI.Al$_2$O$_3$(weight ratio of LiI/Al$_2$O$_3$-2/1)/BiBr$_3$.TiS$_2$.Bi

EXAMPLE IV

Electrochemical button cells employing a lithium anode, a lithium iodide/alumina electroltye and a ferric chloride/titanium disulfide cathode 1.52 cm in diameter were constructed having a stoichiometric energy capacity of 126 mA hrs. Upon discharge at 37° C. through a 200 kilo-ohm resistance, two examples of the cell gave substantially identical discharge curves with the OCV being about 2.84 volts and the initial discharge plateau being at about 2.1 volts.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A solid state lithium electrochemical cell having a lithium anode, a solid state electrolyte capable of lithium-ion transport, having a high electronic resistivity and selected from the group of lithium nitride, lithium sulfide, lithium metaborate and lithium iodide in contact with said lithium anode and a cathode, separated from said lithium anode by said electrolyte, comprising at least one high energy denisty compound reactive with said electrolyte and separated from said electrolyte by a stable, in-situ formed, self-healing layer of electrolytically conductive reaction product of said electrolyte and said cathode material, said anode and said cathode being in electrolytically conductive contact through said electrolyte and said in-situ formed, self-healing layer.

2. An electrochemical cell as in claim 1 wherein the high energy density material is selected from the group of fluorides, chlorides and bromides of bismuth, tin, copper, lead and iron.

3. An electrochemical cells in claim 1 wherein the high energy density material is bismuth bromide.

4. An electrochemical cell as in claim 1 wherein the high energy density material is ferric chloride.

5. An electrochemical cell as in claim 2 having a lithium iodide electrolyte.

* * * * *